(12) United States Patent
Böhme et al.

(10) Patent No.: US 11,960,143 B2
(45) Date of Patent: Apr. 16, 2024

(54) VOICE COIL ACTUATOR FOR ANGULAR MOVEMENTS

(71) Applicant: THORLABS GMBH, Bergkirchen (DE)

(72) Inventors: Tobias Böhme, Munich (DE); Egbert Krause, Burgstädt (DE); Stefan Michael Friedrich Baumhackl, Schiltberg (DE)

(73) Assignee: THORLABS GmbH, Bergkirchen (DE)

( * ) Notice: Subject to any disclaimer, the term of this patent is extended or adjusted under 35 U.S.C. 154(b) by 758 days.

(21) Appl. No.: 17/097,761

(22) Filed: Nov. 13, 2020

(65) Prior Publication Data
US 2021/0141191 A1 May 13, 2021

Related U.S. Application Data

(60) Provisional application No. 62/934,772, filed on Nov. 13, 2019.

(51) Int. Cl.
*G02B 26/08* (2006.01)
*G02B 7/182* (2021.01)
(Continued)

(52) U.S. Cl.
CPC ......... *G02B 7/182* (2013.01); *G02B 26/0816* (2013.01); *H02K 11/21* (2016.01); *H02K 41/0358* (2013.01)

(58) Field of Classification Search
CPC .. G02B 7/182; G02B 26/0816; G02B 26/105; G02B 26/101; H02K 11/21;
(Continued)

(56) References Cited

U.S. PATENT DOCUMENTS 5,959,758 A 9/1999 Seo
7,009,752 B1 * 3/2006 Lorell ................ G02B 26/0816
359/290

(Continued)

FOREIGN PATENT DOCUMENTS

EP 0 790 512 A1 8/1997
EP 3 006 975 A2 4/2016
WO 2009/106094 A1 9/2009

OTHER PUBLICATIONS

European Search Report and Written Opinion issued by the European Patent Office for corresponding European Patent Application No. 20205601.6, dated Mar. 3, 2021.

(Continued)

*Primary Examiner* — Euncha P Cherry
(74) *Attorney, Agent, or Firm* — Myers Wolin, LLC

(57) ABSTRACT

A positioning system, including: a first plate; a second plate coupled to the first plate and pivotable about an axis; a pair of voice coil actuators configured to rotate the second plate about this axis; and a processor configured to drive currents to the pair of voice coil actuators; wherein the pair of voice coil actuators comprises a first and second magnet structures mounted on the first plate at equal and opposite distance from the axis, and a first and second coils mounted on the second plate and positioned such that the respective first and second magnet structures move in and out of the first and second coils when the second plate rotates about the axis; wherein each of the first and second magnet structures substantially conforms to an arc having a center at the axis and a radius equal to the distance of the magnet structure from the axis.

14 Claims, 18 Drawing Sheets

(51) Int. Cl.
*H02K 11/21* (2016.01)
*H02K 41/035* (2006.01)

(58) Field of Classification Search
CPC .. H02K 41/0358; H02K 41/0356; H02K 7/14; H02K 16/00; H02K 2201/18; H02K 11/33; H01F 7/0289; H01F 7/066; H01F 7/14

See application file for complete search history.

(56) References Cited

U.S. PATENT DOCUMENTS

| | | |
|---|---|---|
| 9,354,422 B1 | 5/2016 | Quakenbush |
| 9,450,670 B1 | 9/2016 | Fleischer et al. |
| 9,658,427 B2 | 5/2017 | Bullard et al. |
| 9,746,665 B1 | 8/2017 | Quakenbush |
| 9,765,920 B2 | 9/2017 | Hastings |
| 10,203,475 B2 * | 2/2019 | Balaban .............. G02B 26/0816 |
| 2008/0143194 A1 * | 6/2008 | Laughlin .............. H02K 41/031 310/12.32 |
| 2017/0139202 A1 | 5/2017 | Van Biesen |
| 2018/0113277 A1 | 4/2018 | Balaban et al. |

OTHER PUBLICATIONS

First Notification of Office Action and Search Report issued by the China National Intellectual Property Administration for Chinese Patent Application No. 202011273088.6, dated Sep. 23, 2023, with an English translation.

\* cited by examiner

VOICE COIL ACTUATOR FOR ANGULAR MOVEMENTS

CROSS REFERENCE TO RELATED APPLICATIONS

This application claims the benefit of U.S. Provisional Patent Application No. 62/934,772 filed on Nov. 13, 2019. The contents of U.S. Provisional Patent Application 62/934,772 are hereby incorporated by reference.

FIELD OF THE INVENTION

The present invention relates to actuators, and more specifically to a voice coil actuator for angular movements or spherical movements.

BACKGROUND

Angular or spherical movements in optical elements within an optical beam axis are necessary in many scanning, tracking applications, as well as other applications requiring a controllable steering of a light beam.

Fast steering mirror (FSM) system is a precise beam steering mechanism which modulates the beam between a light source and a receiver using its reflecting surface. FIG. 1 illustrates an existing FSM system where a mirror is supported by a pivotable support or gimbal. Four voice coil actuators work in pairs to drive the mirror so that the mirror tilts in the x and y directions. Voice coil actuator is a high performance, and compact actuator specifically developed for applications requiring both high precision and high-speed positioning over a short to medium travel range. Note that the FSM system needs to provide spherical movements, but the voice coil actuator uses a straight magnet and straight coil. It is known that there are some significant limitations to the existing FSM system.

For an existing FSM system shown in FIG. 2A, in the tilted position, due to force nonlinearity, left and right forces are in imbalance. As can be seen from FIGS. 2B and 2C, the left force is different from the right force due to their respective magnet positions relative to their coils. A voice coil is more or less only effective, if the magnetic pole is inside the coil. As shown in FIG. 2A, only one voice coil (with left magnet in coil) creates a force on the axis, the second voice coil is not effective (pole of right magnet outside of coil). The opposite forces on the axis are asymmetric. Thus, at the pivot bearing, the resulting net force AF is non-zero. This stress results in wear and tear in the bearing. Furthermore, as the system tilts back and forth, the resulting oscillating force at the bearing may stimulate undesired resonances.

For voice coil actuators, the coil efficiency depends on the coil position relative to the magnetic pole as well as the air gap between the magnet and the coil. FIG. 3 illustrates the coil efficiencies for various coil diameters as functions of coil position relative to the magnet. The maximum force occurs when pole of the magnet is at the edge of the coil. Therefore, the coil efficiencies are low in existing systems because, as can be seen from FIG. 2A, the pole of the right side magnet is outside far from the coil.

As shown in FIG. 4, the maximum force gets bigger as the diameter of the coil and thereby the gap between coil and magnet decreases. Note that when the coil diameter becomes smaller than a certain value, the smaller coils become not usable because the magnet will touch the coil by nonlinear movements As shown in FIG. 5, there is no linear movement of the magnets in the coils, and also the coils do not have only one winding and have several millimeters in height. Therefore, the gap between the magnet and coil get smaller for higher deflections, and at some tilt angle value, there will be a collision of the magnets with the coils for smaller gaps.

FIG. 6 illustrates the graphs of drive voltage versus tilt angle for the left and right coils in an existing system. With the asymmetric forces, only the sum of both voice coil actuators will produce a linearity function. FIG. 7 shows the derivatives of the drive voltage versus title angle for the left and right coils in an existing system. As can be seen, the efficiencies and forces of the coils are largely different. The existing system suffers from the deficiency that same voltages applied to opposite coils generate highly asymmetric forces.

Therefore, there is a long-felt need for a voice coil positioning system for angular or spherical movements that does not have the above discussed shortcomings in the existing devices or systems.

SUMMARY

In one embodiment, the driving force for spherical movement is generated by a combination of a bended fixed coil and moving magnet (voice coil). The maximum force which can be generated largely depends on the gap between magnet and coil. The smaller the gap the higher is the magnetic flux density through the coil windings and the higher the resulting Lorentz force. For a linear driveway, small gaps can be realized easily, but not for an angular or spherical movement. Therefore, in one embodiment, the complete system includes bent "magnet and coil" for getting more performance on the complete working area.

Additionally there is only a small region, where the actuator generates the maximum forces. In one embodiment, for getting a better linearity, the coil is split into 2 or more segments. The split coil has the advantage that (except a small transition region) only the upper or the lower coil is exposed to the drive current. This allows the system to focus the available current towards the actual position of pole of the magnet. The efficiency increases because the less efficient part of the coil is switched off which reduces the power dissipation and the heat input to the non-active coil.

In one embodiment, the coils are manufactured using a self-bonding wire which is wound around a removable core and 'baked' at high temperature. After this 'baking' the coil is fixed in shape and the core can be removed. It leaves a coil that allows a smaller gap to the inner magnet because of the missing coil body. In addition, the coil shape is not straight but angled in order follow the curved magnet path better.

In one embodiment, a composite magnet is built by gluing several smaller disk magnets in a real banana shape (based on the spherical movement of the gimbal). The last magnet on the "working" side is a little bit bigger in diameter to decrease the gap to the coil. The smaller magnets above are mostly used to keep the opposite pole of the magnet outside of the coil (otherwise the forces would be equalized). For the smaller magnets the size of the gap to the coil has no influence, as the device only uses the flux at the bottom end of a banana-shaped structure.

One embodiment uses generally available simple and cheap disk magnets which is an economic alternative to an ideally shaped curved magnet which can be manufactured by eroding at a much higher cost.

An embodiment of the present invention provides a positioning system, including: a first plate; a second plate coupled to the first plate via a pivot and pivotable about at least one axis with respect to the first plate; a pair of voice coil actuators configured to rotate the second plate relative to the first plate about the at least one axis; and a processor configured to drive currents to the pair of voice coil actuators; wherein the pair of voice coil actuators comprises a first and second magnet structures mounted on one of the first and second plates at equal and opposite distance from the at least one axis, and a first and second coils mounted on the other one of the first and second plates and positioned such that the respective first and second magnet structures move in and out of the first and second coils when the second plate rotates about the at least one axis relative to the first plate; wherein each of the first and second magnet structures substantially conforms to an arc having a center at the at least one axis and a radius equal to the distance of the magnet structure from the at least one axis.

DETAILED DESCRIPTION OF THE PREFERRED EMBODIMENTS

Figure 1:
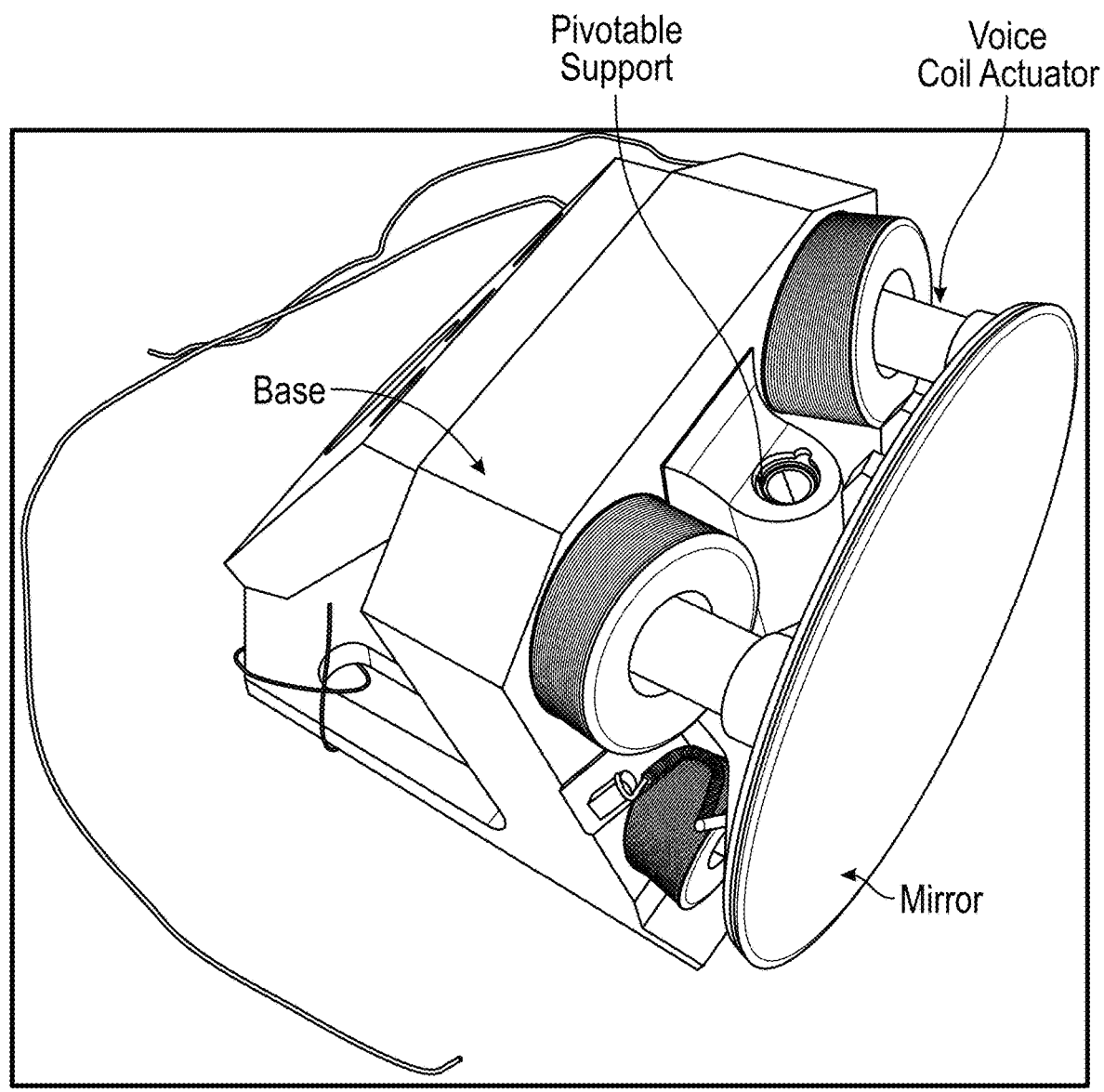
FIG. 1 illustrates an existing fast steering mirror system with voice coil actuators.
Figure 2A:
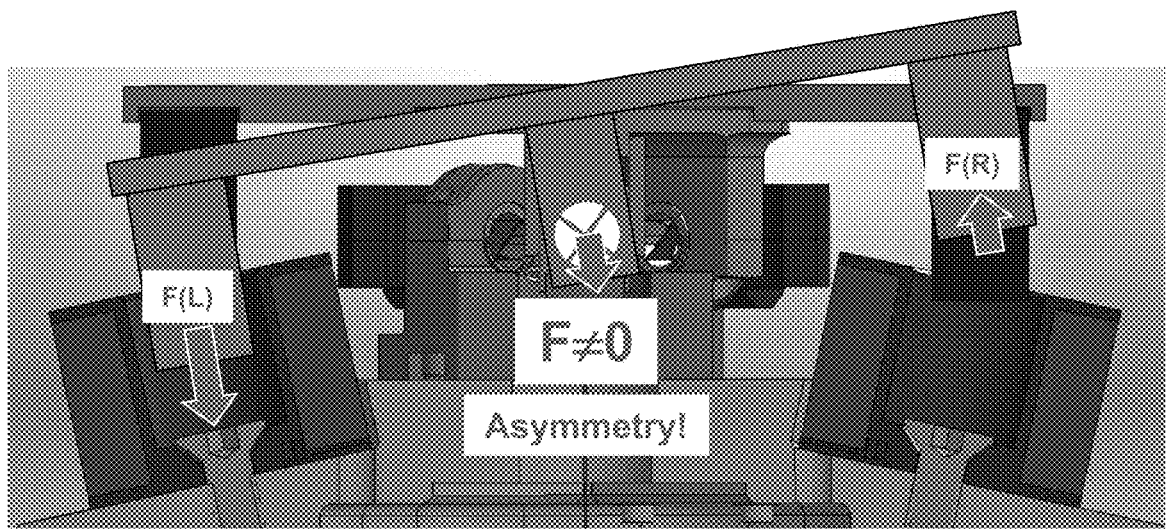
FIG. 2A illustrates a non-zero force exerted on the pivot support.
Figure 2B:
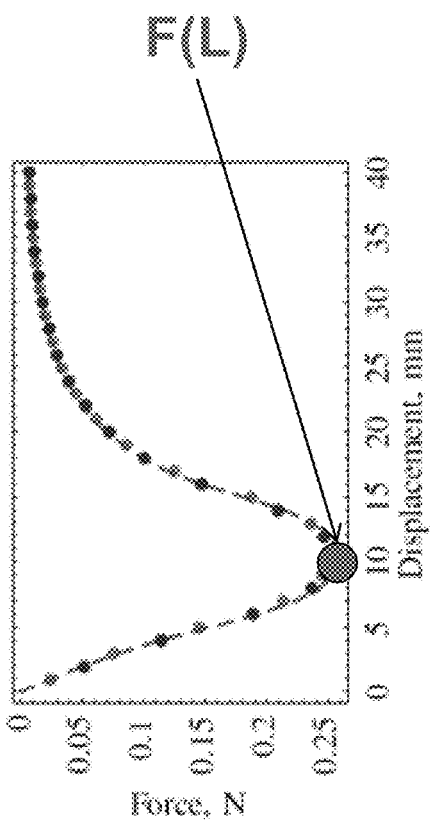
FIG. 2B illustrates the left voice coil force and FIG. 2C illustrates the right voice coil force.
Figure 2C:
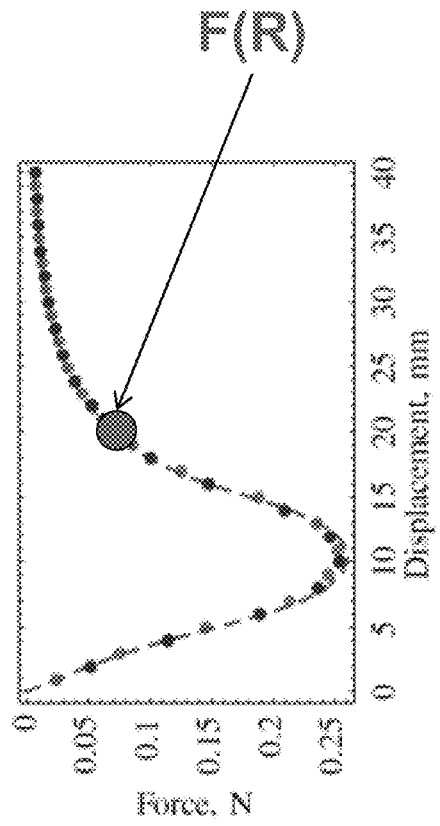
Figure 3:
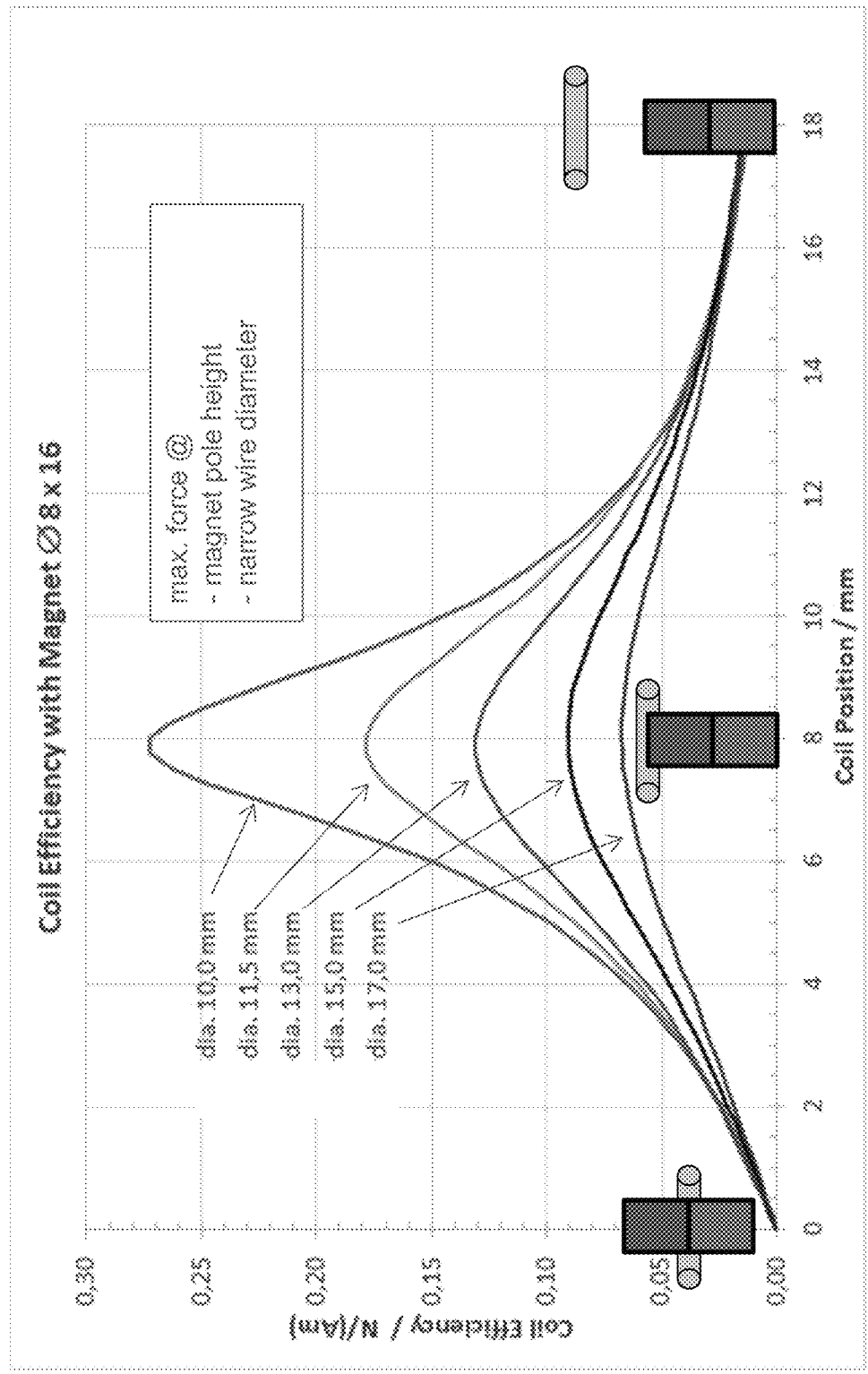
FIG. 3 illustrates the coil efficiency as a function of coil positions.
Figure 4:
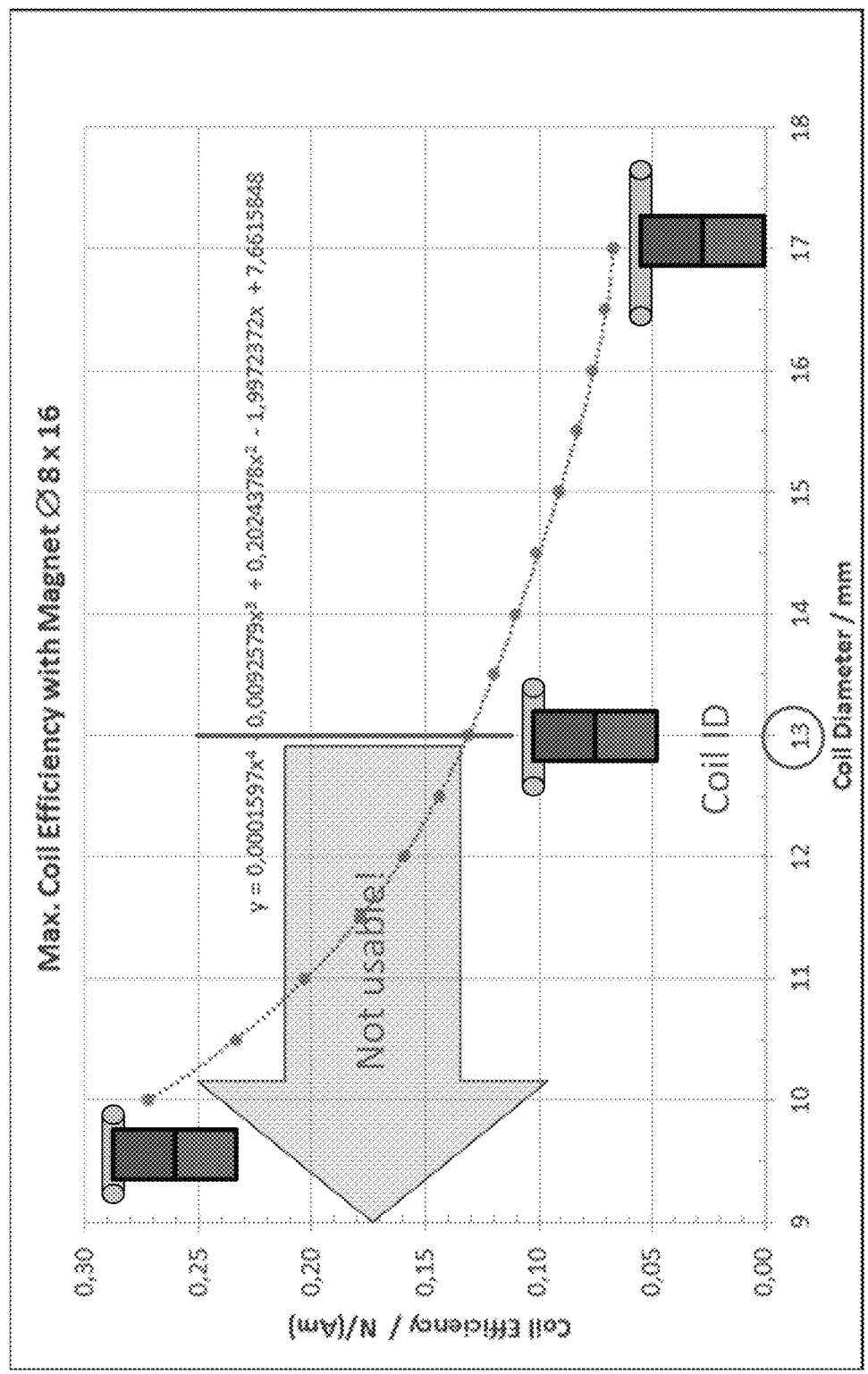
FIG. 4 illustrates the maximum coil efficiency as a function of gap width between coil and magnet for a fixed magnet diameter of 8 mm.
Figure 5:
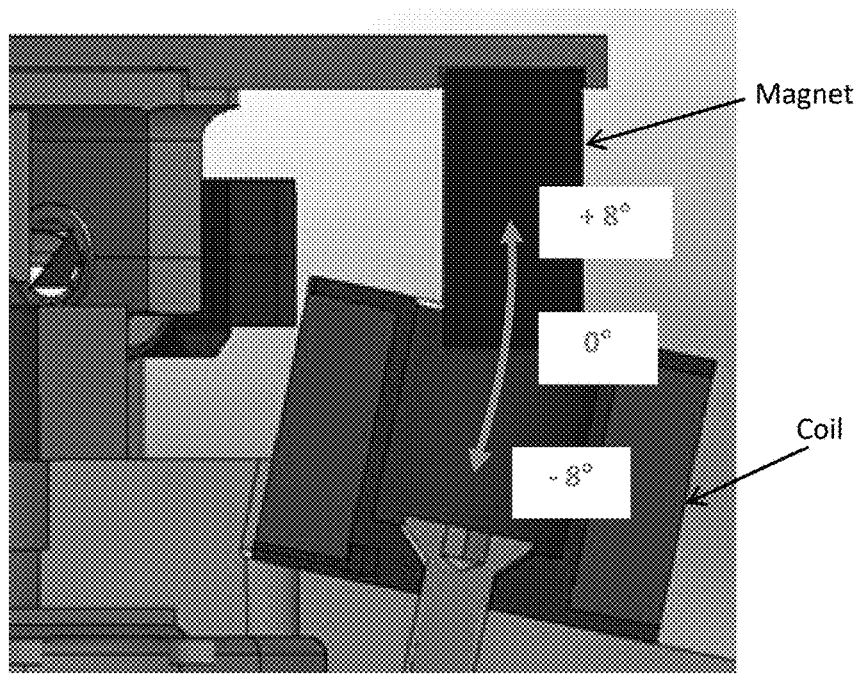
FIG. 5 illustrates the angular range of an existing system and shows the non-usable area due to collisions by the spherical movements.
Figure 6:
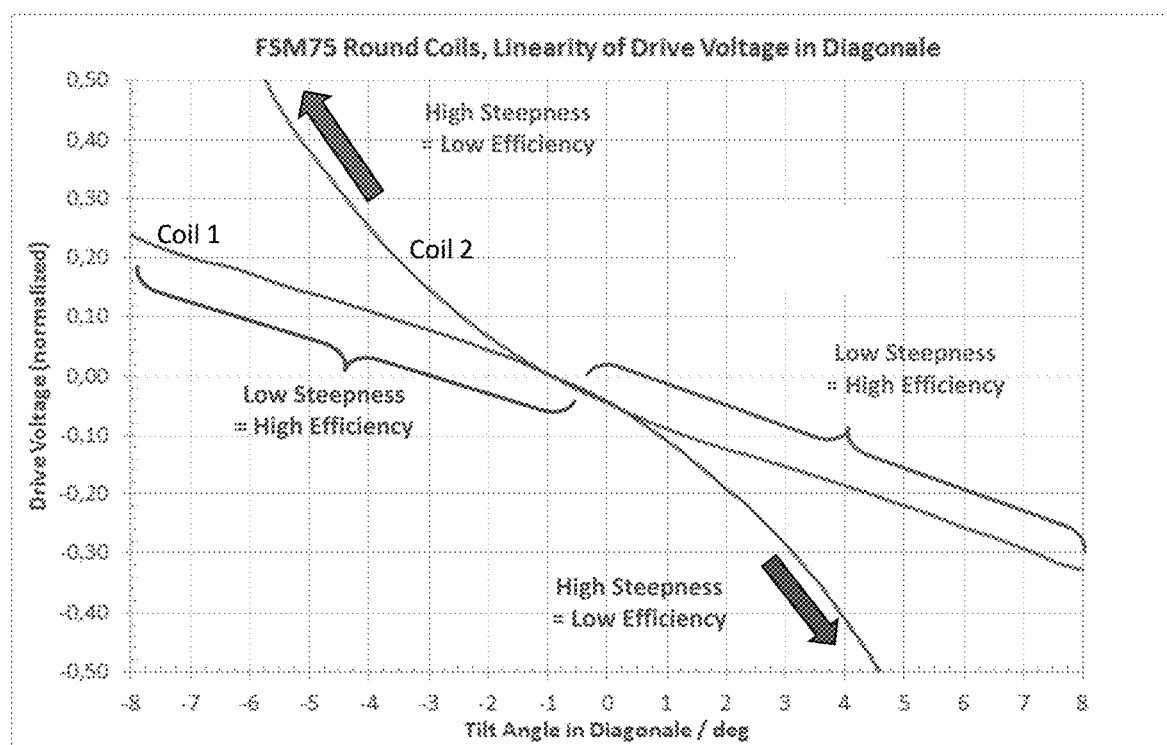
FIG. 6 illustrates the drive voltage as a function of tilt angles for an existing system.
Figure 7:
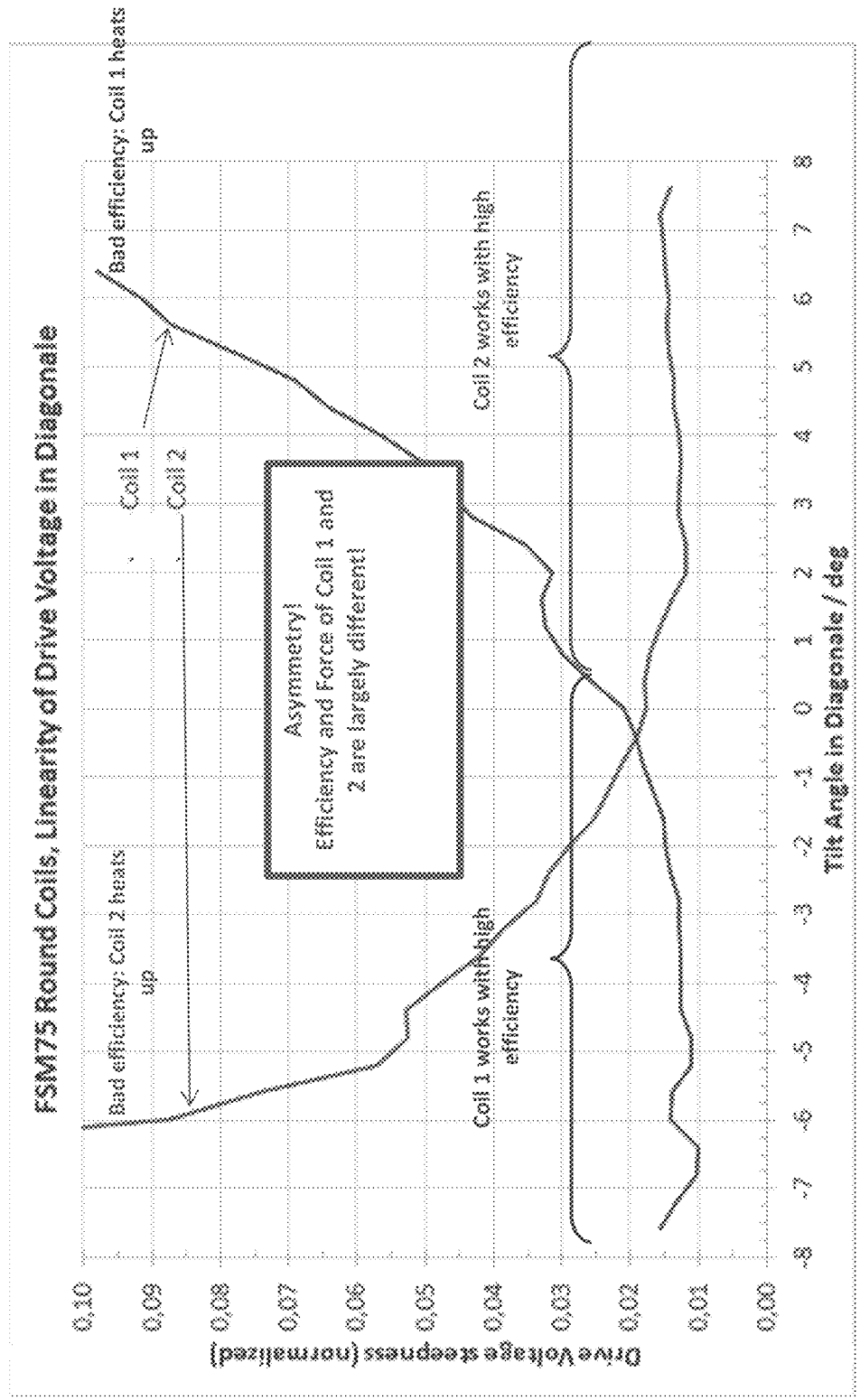
FIG. 7 illustrates the drive voltage steepness as a function of tilt angles for an existing system.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 23:
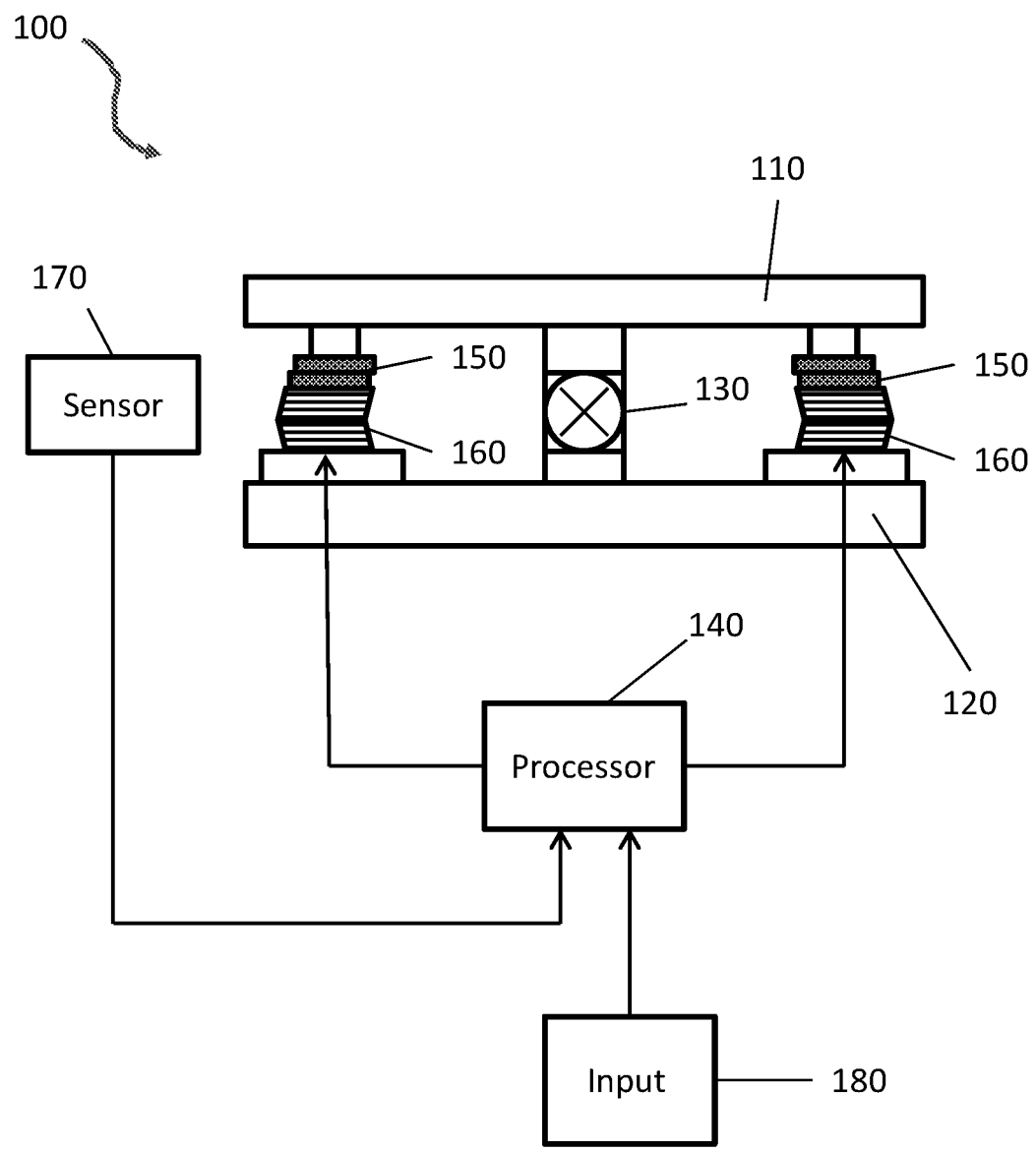
FIG. 23 illustrates a positioning system according to an embodiment.

FIG. 23 illustrates a positioning system 100 according to an embodiment. The system includes a first plate 110; a second plate 120 coupled to the first plate and pivotable about at least one axis with respect to the first plate via a pivotable structure 130; a pair of voice coil actuators per axis configured to rotate the second plate relative to the first plate about the at least one axis; and a processor 140 configured to drive currents to the pair of voice coil actuators; wherein the pair of voice coil actuators comprises a first and second magnet structures 150 mounted on the second plate at equal and opposite distance from the at least one axis, and a first and second coils 160 mounted on the first plate and positioned such that the respective first and second magnet structures move in and out of the first and second coils when the second plate rotates about the at least one axis relative to the first plate; wherein each of the magnet structures substantially conforms to an arc having a center at the at least one axis and a radius equal to the distance of the magnet structure from the at least one axis. Also shown in FIG. 23 is a sensor 170 configured to detect a position of a magnet structure, and the detected position is fed back to the processor. An input device 180 may allow a user to enter the desired rotation of the system.

Figure 8:
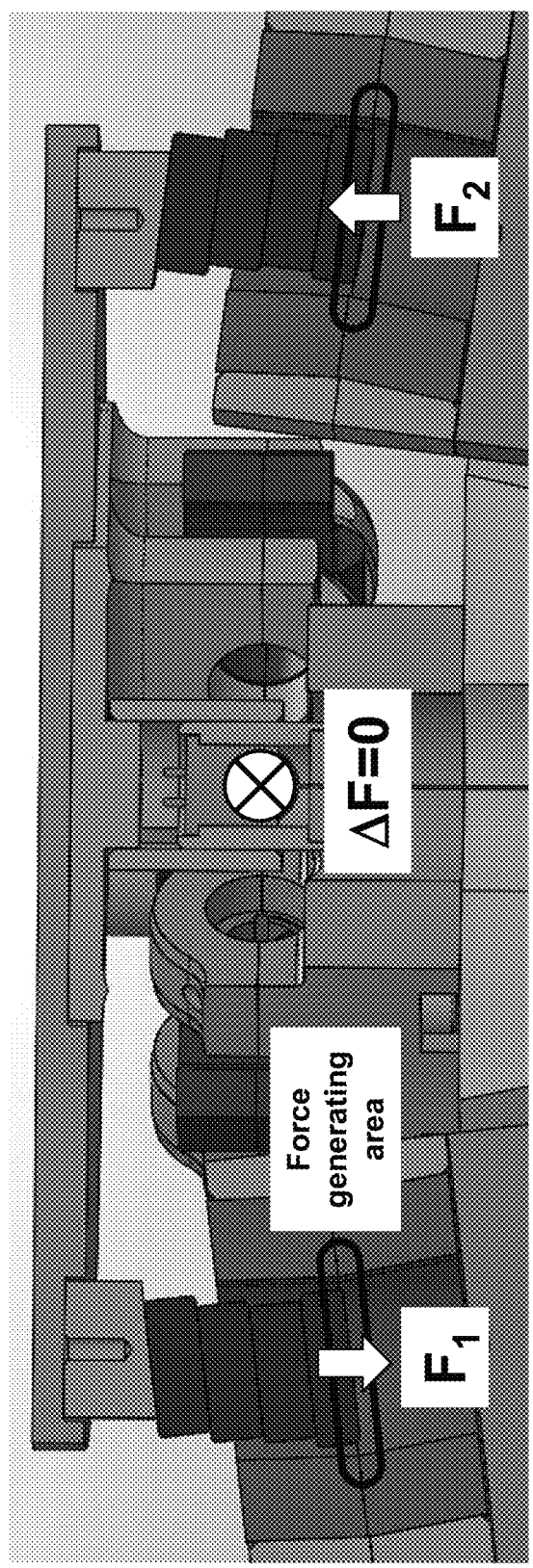
FIG. 8 illustrates the forces at the neutral position of a system according to an embodiment.
Figure 9:
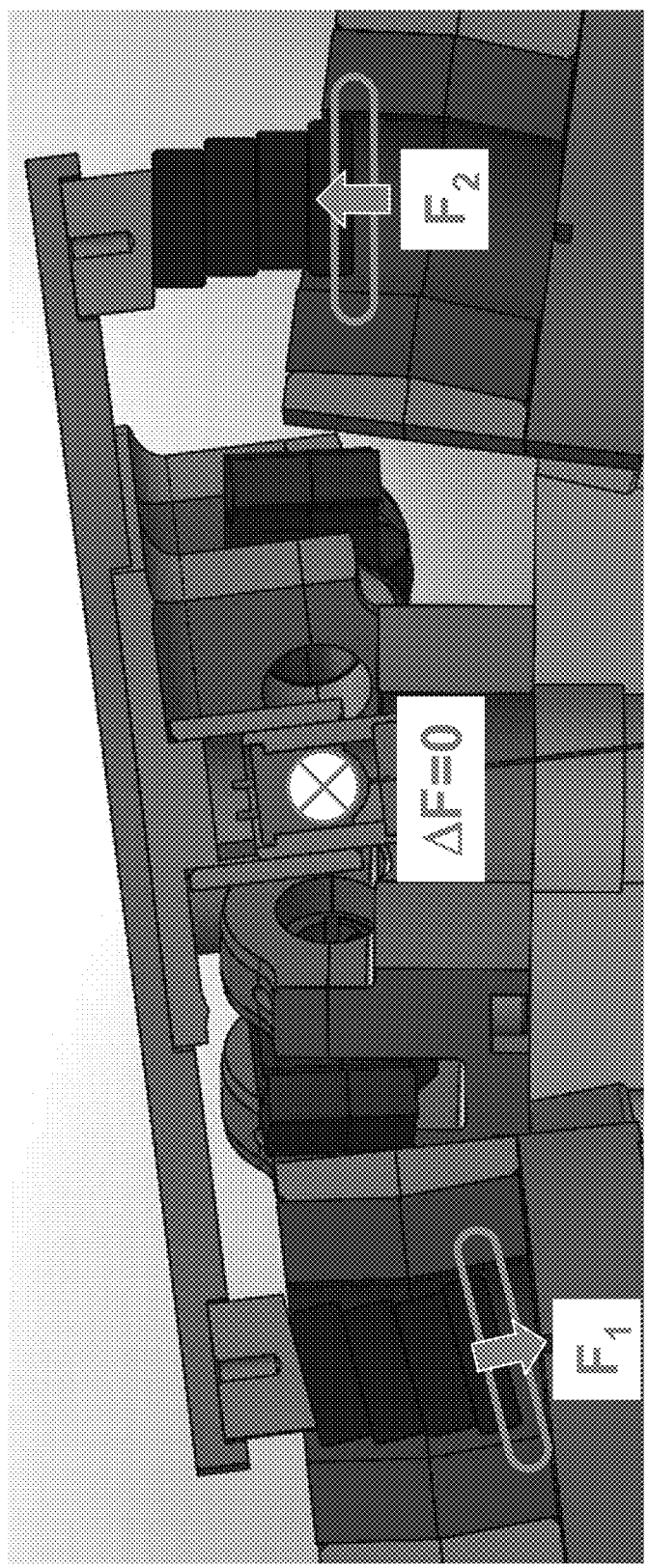
FIG. 9 illustrates the forces at a tilt position of a system according to an embodiment.

FIGS. 8 and 9 illustrate the forces in a positioning system according to an embodiment. FIG. 8 shows the forces when the system is in its neutral position, i.e., tilt angle=0°. The magnitude of the force on the left $F_1$ is equal to the magnitude of the force on the right $F_2$. The magnets are centered to the coils in neutral position. Since the left and right forces are equal and opposite, the resulting net force at the bearing is zero. FIG. 9 shows the forces when the system is in a tilted position. Due to vertical symmetry, both forces stay balanced in all angular positions. Therefore, the magnitude of the force on the left $F_1$ is equal to the magnitude of the force on the right $F_2$ for all angles. The resulting net force $\Delta F$ is zero or substantially zero for all tilt angles. Since both forces stay balanced in all angular position, there is less stress on the bearing and there is no undesired stimulation of mechanical resonances.

Figure 10:
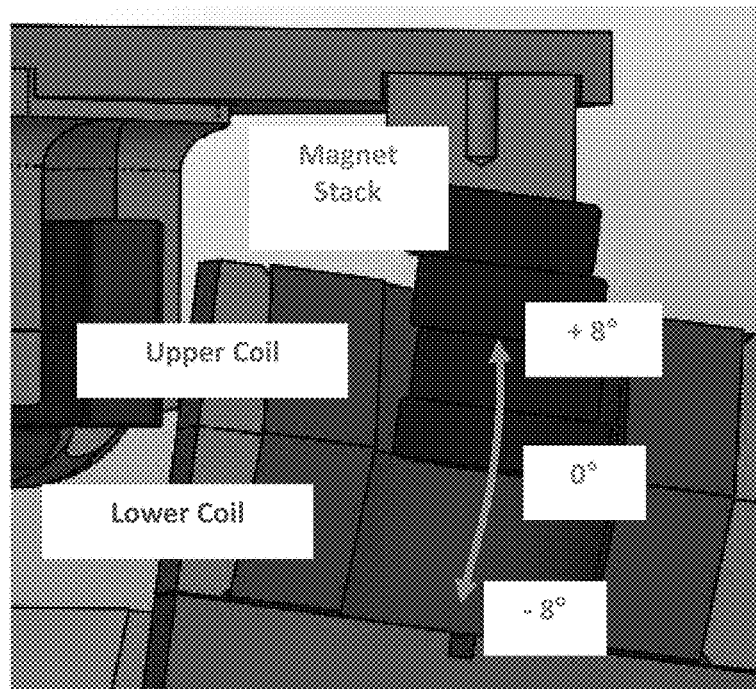
FIG. 10 illustrates the angular range of a system according to an embodiment.

FIG. 10 illustrates the magnet structure and coil according to an embodiment. As can be seen, the magnet stack includes a number of disc magnets arranged to conform substantially to the arc of the rotational movement. In one embodiment, the arc is a±8° segment of a circle with a radius equal to the distance of the coil/magnet structure from the pivot (center of the circle). The coil is split into an upper coil segment and a lower coil segment. The coil is bent such that the centers of the middle and both ends of the coil coincide substantially with the arc of the rotational movement.

Figure 11:
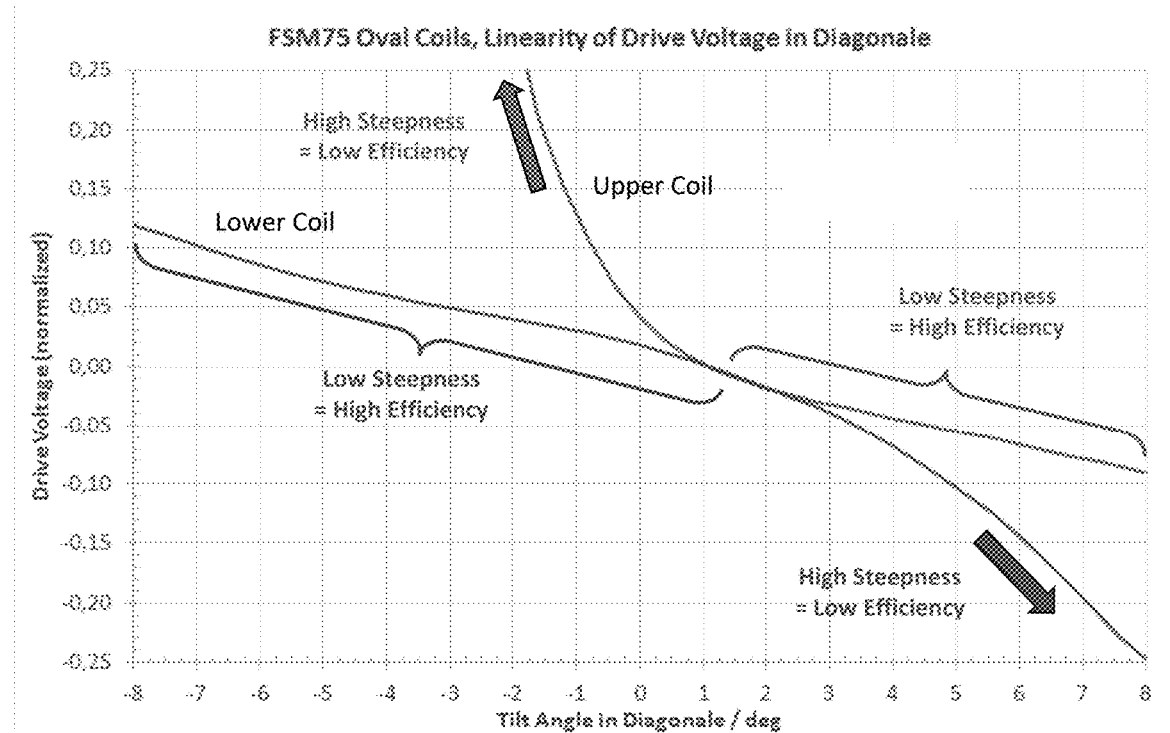
FIG. 11 illustrates the drive voltage as a function of tilt angles for a system according to an embodiment.
Figure 12:
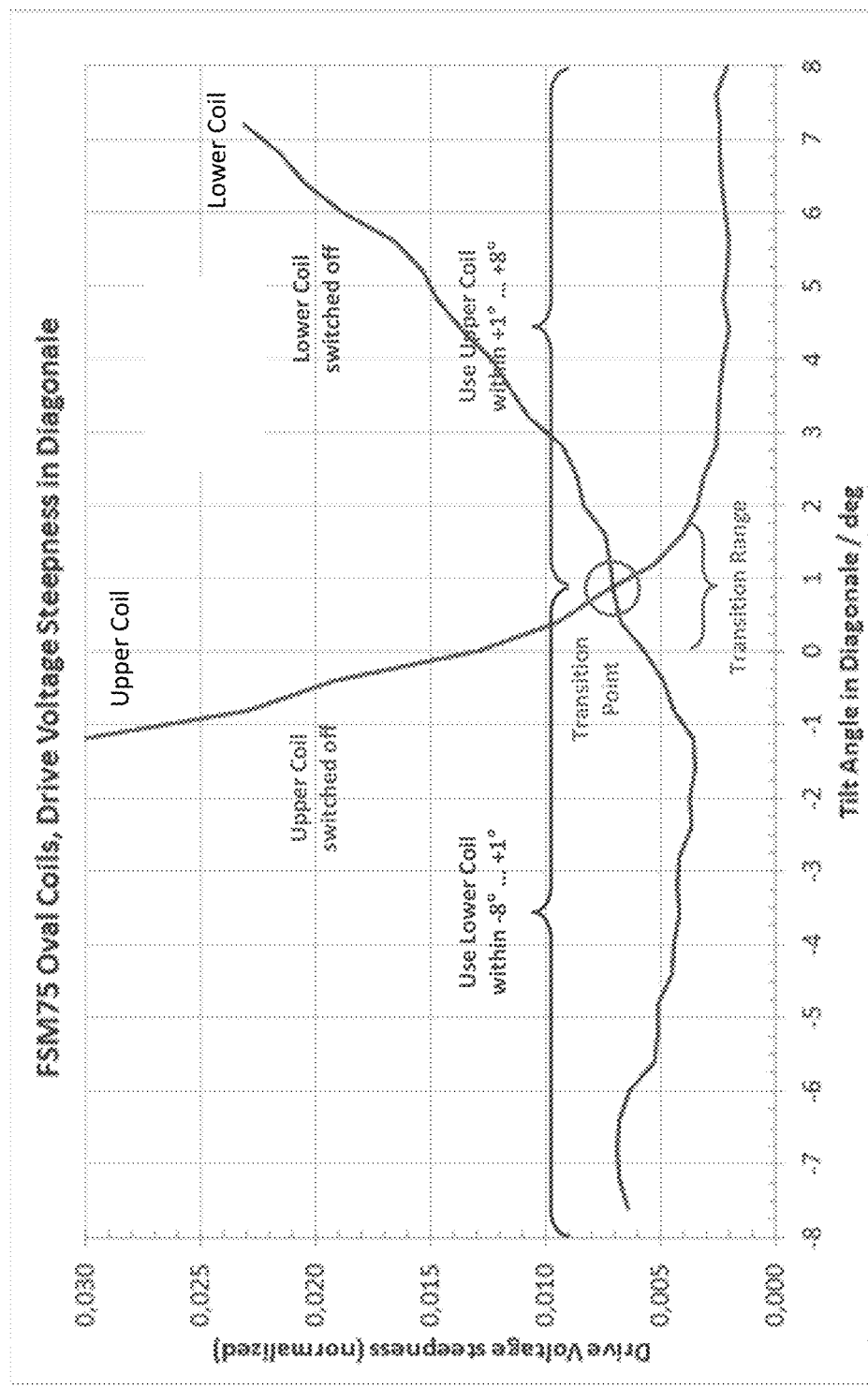
FIG. 12 illustrates the drive voltage steepness as a function of tilt angles for a system according to an embodiment.

FIG. 11 shows the drive voltage versus tile angle for the upper and lower coil segments. It can be seen that each has a low steepness region (i.e., high efficiency) in the range of tile angles. Therefore, high coil efficiency can be achieved by switching on the upper coil segment when the tilt angle is in the efficient range of the upper coil segment and switch on the lower coil segment when the tilt angle is in the efficient range of the lower coil segment. FIG. 12 shows the drive voltage steepness versus tile angle for the upper and lower coil segments. In this example, the lower coil segment is activated when the tilt angle is between −8° and +1°, and the upper coil segment is activated when the tilt angle is between +1° and +8°. FIG. 12 also shows a transition range in which the switching between the upper lower coil segment and lower coil segment can take place.

Figure 13:
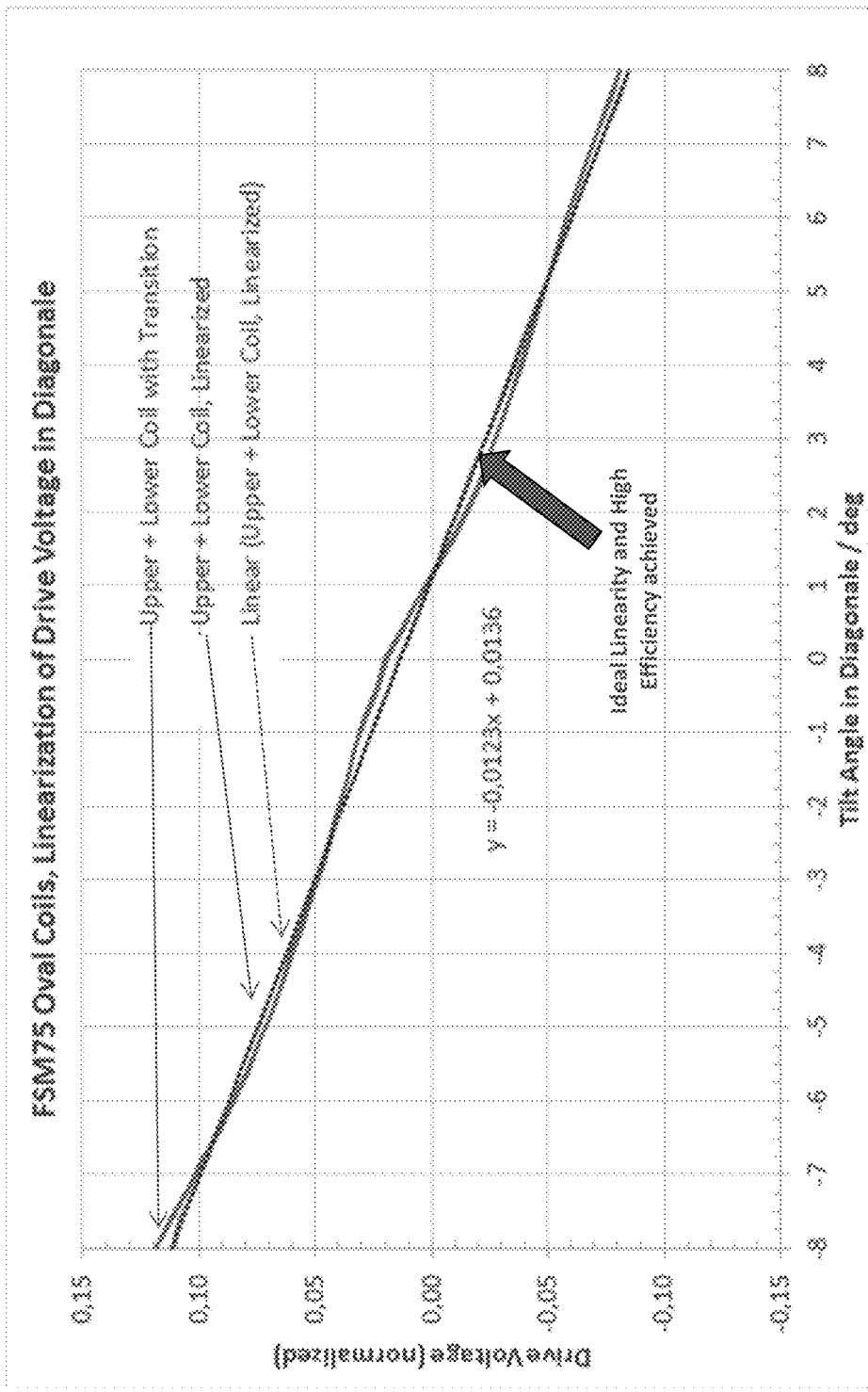
FIG. 13 illustrates the linearization of drive voltage as a function of tilt angles for a system according to an embodiment.
Figure 14:
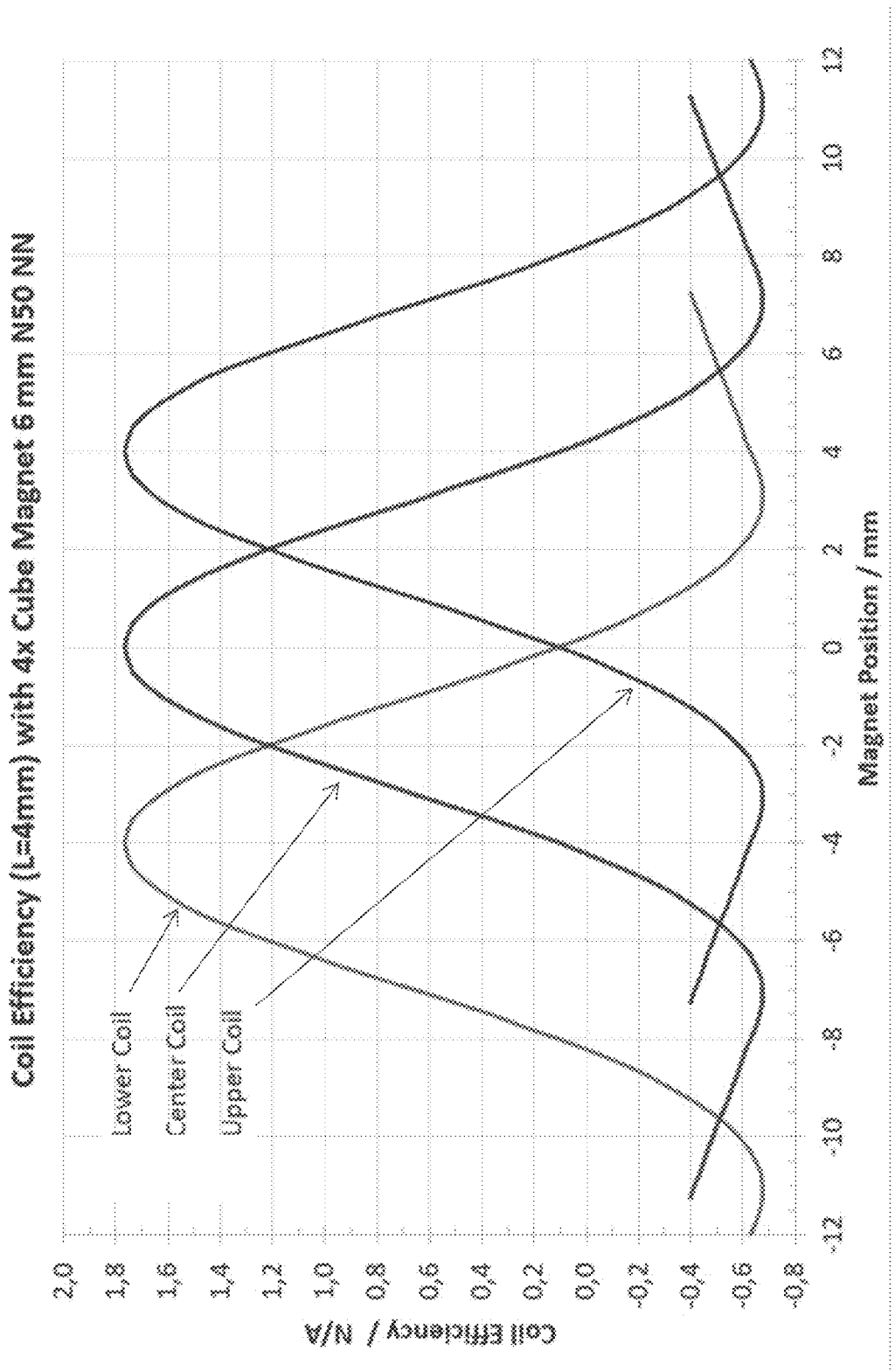
FIG. 14 illustrates the coil efficiency as a function of magnet positions for a 3-coil system according to an embodiment.

FIG. 13 shows that the twin coil segment according to an embodiment can achieve excellent linearity. FIG. 14 shows the coil efficiencies of a coil having three coil segments according to an embodiment. In general, it is contemplated that a coil having a plurality of coil segments may be used to realize high coil efficiency and drive voltage linearity. The system uses coil segments only in their higher respective efficient ranges. The maximum drive force can be about 10 times the static spring force of the bearings.

Figure 15:
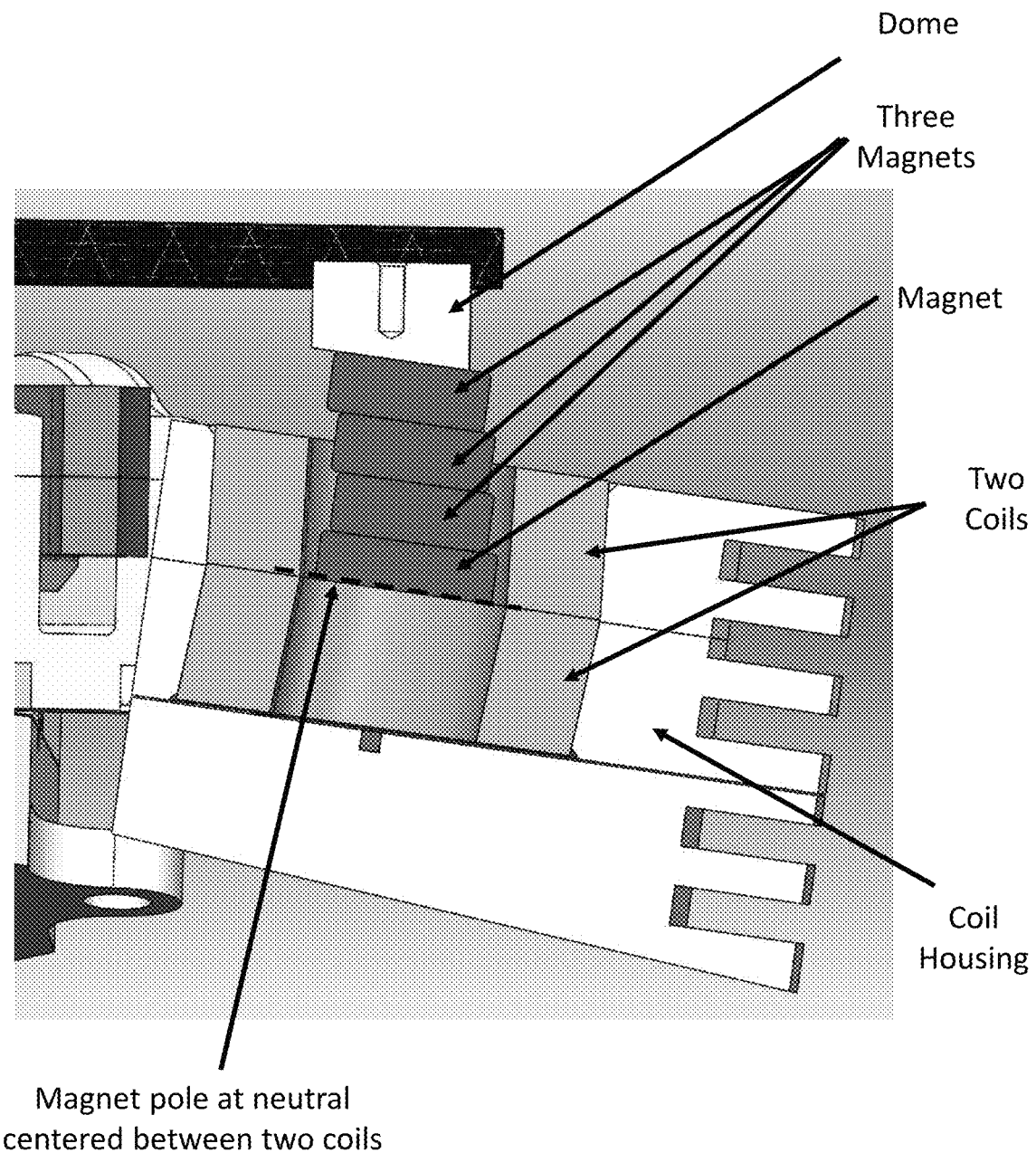
FIG. 15 illustrates the voice coil design according to an embodiment.
Figure 16:
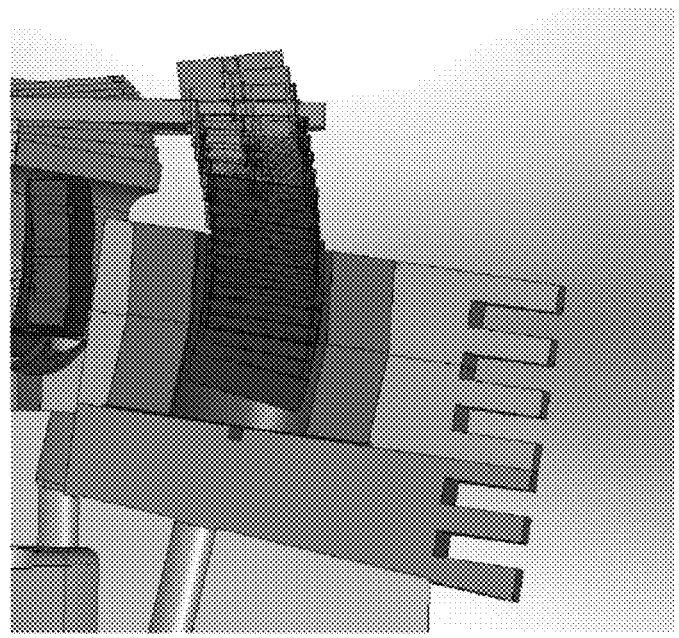
FIG. 16 illustrates the magnet structure moving in and out of the coil assembly according to an embodiment.
Figure 17:
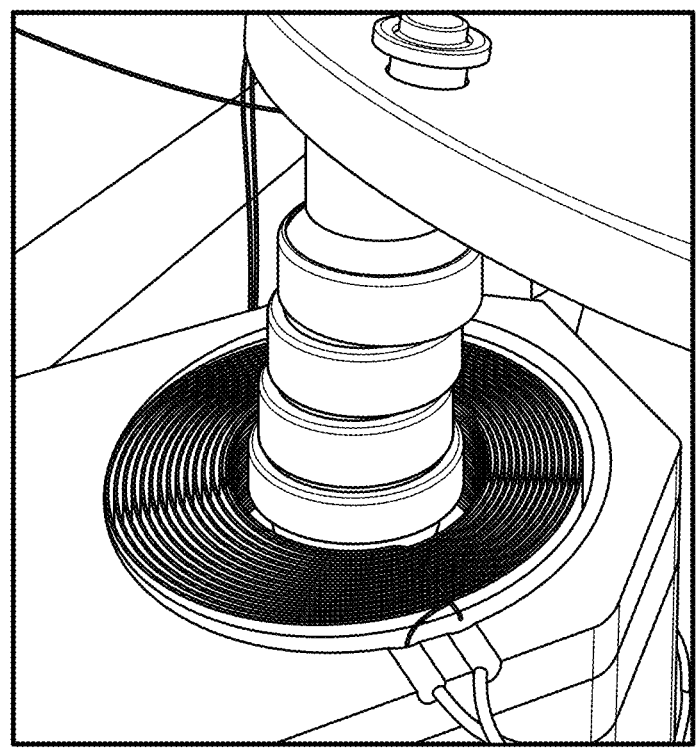
FIG. 17 is a photograph of the magnet structure and coil assembly according to an embodiment.

FIG. 15 shows the voice coil design according to an embodiment. One side of the dome is fixed to the plate or mirror and the other side is glued to the magnet structure. In this example embodiment, the structure includes three disc magnets of smaller diameter and a larger disc magnet. The magnets are glued off-center to get the desire round shape that substantially follows the arc of the movement, or have a similar curved design for reducing the gap between the magnet structure and the coil so as to increase the achievable forces. (see FIG. 16). In the neutral position (tilt angle=0°), the pole of the larger magnet is centered between the two coil segments. Each of the coil segments is slanted to substantially follow the arc of the movement of the magnets. The coil is supported by the coil housing. FIG. 17 shows a photo of the voice coil according to an embodiment.

Figure 18:
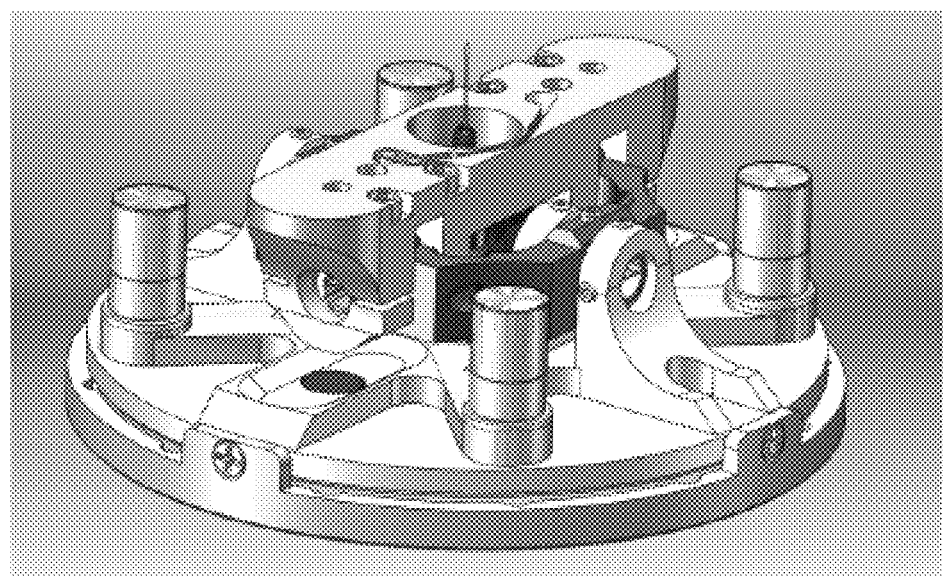
FIG. 18 is a perspective view of the base of a positioning system according to an embodiment.
Figure 19:
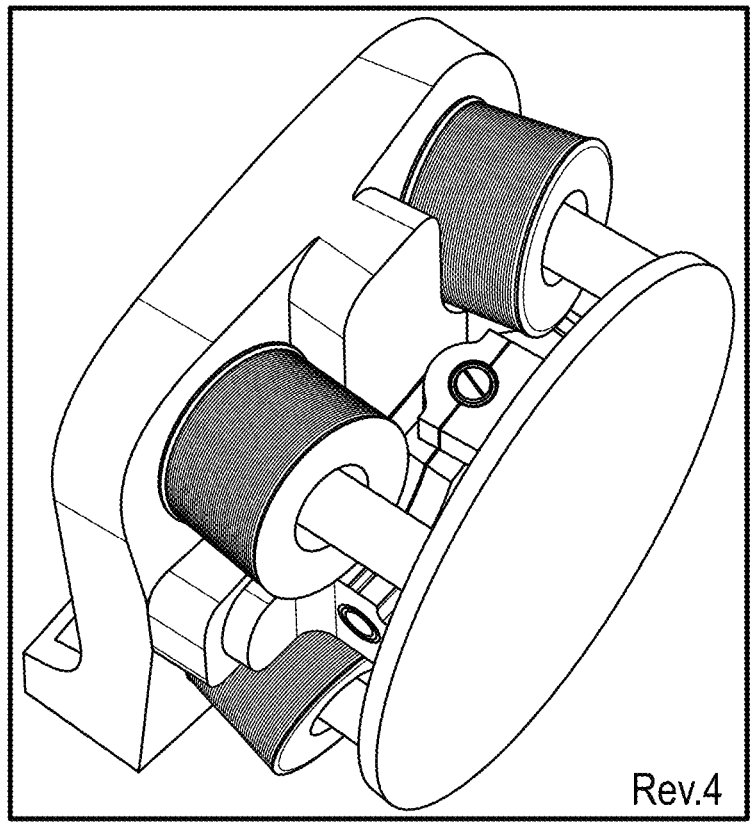
FIG. 19 is a photograph of a positioning system according to an embodiment.
Figure 20:
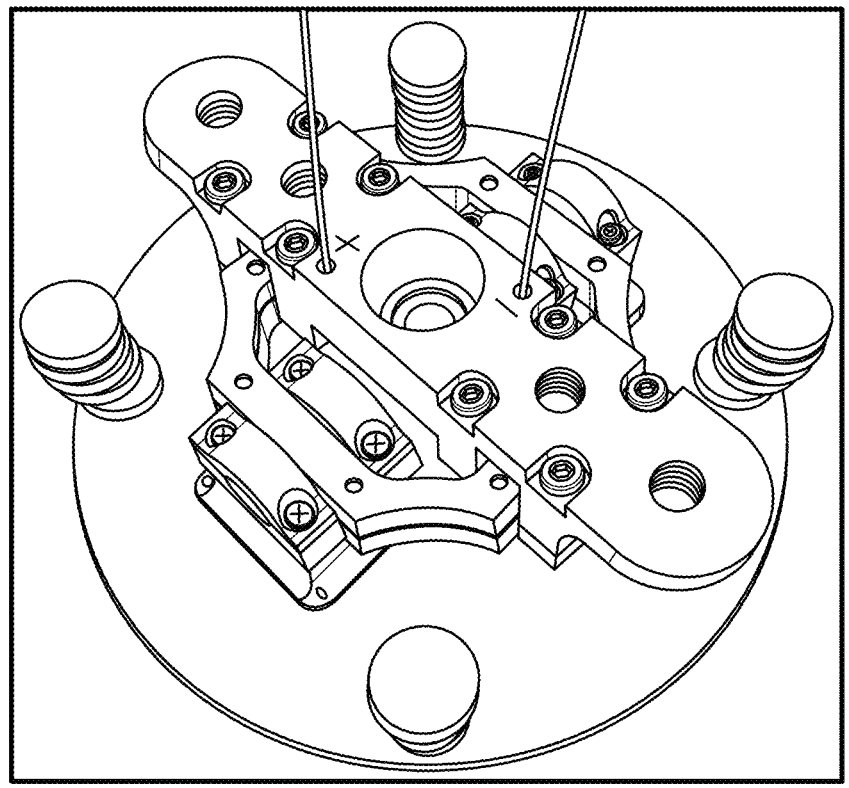
FIG. 20 is a photograph of the platform of a positioning system according to an embodiment.
Figure 21:
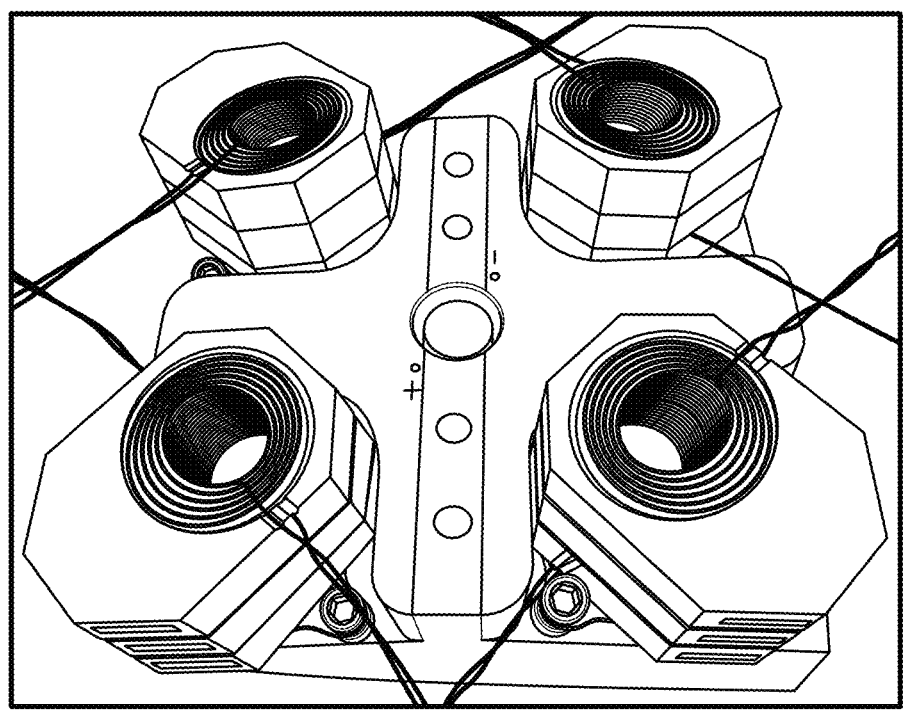
FIG. 21 is a photograph of the base of a positioning system according to an embodiment.

In one embodiment, the positioning device is capable of spherical movements. In the positioning device, a platform is coupled to a base plate and the platform is pivotable about two axes with respect to the base plate (for example, the x- and y-axes). In one embodiment, the platform is a plate on which a mirror or other optical element may be mounted. The device includes two pairs of voice coil actuators as discussed above. Each pair provides angular movement along an axis. For example, the first pair of voice coils provides angular movement about the x-axis and the second pair of voice coils provides angular movement about the y-axis. FIG. 18 illustrates the base of the positioning device according to an embodiment. FIG. 19 is a photograph of a positioning system according to an embodiment. FIG. 20 is a photograph of a platform with the pivotable support structure and the four magnet structures according to an embodiment. In one embodiment, the pivotable structure includes one or more bearing that is aligned with the x-axis and another one or more bearing that is aligned with the y-axis. FIG. 21 is a photograph of a base plate with the four coils according to an embodiment. Note that the magnets may be mounted either on the base plate or the platform, and the coils may be mounted on the platform or the base plate accordingly.

Figure 22A:
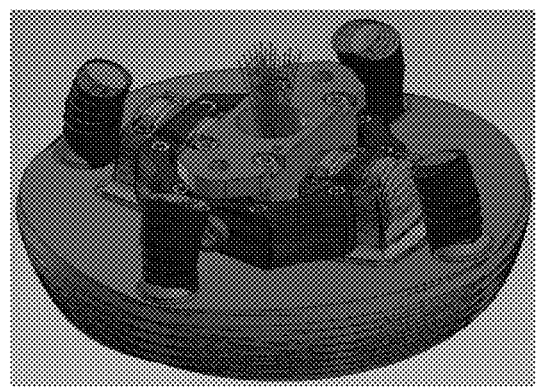
FIGS. 22A-C illustrate the space requirements for magnets in the x- and y-directions.
Figure 22B:
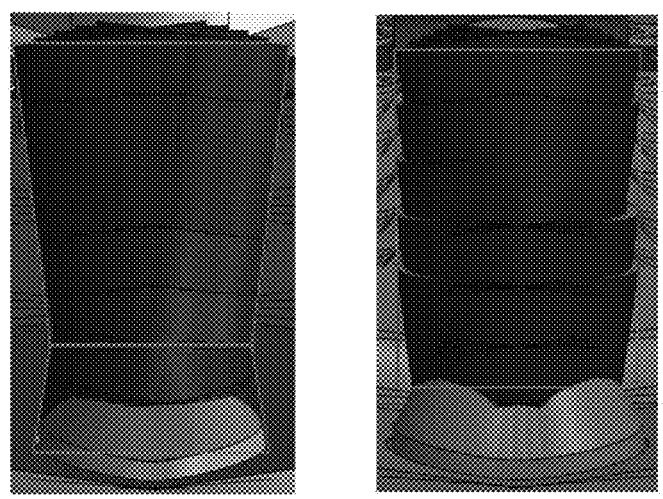
Figure 22C:
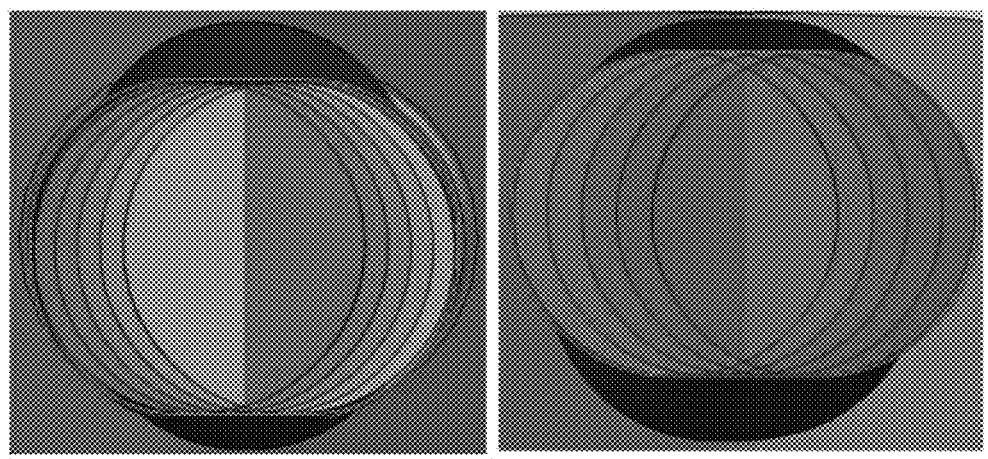

For rotations about the x- and y-axes, space requirements for the magnets in the x- and y-directions are different. The difference is given by the principle of a Gimbal bearing, as pair of magnets is more influenced by the second axis. FIG. 22A is a simulation of space consumption of both pairs of magnets. FIG. 22B shows the side views of the space consumption of the magnets for tilts along the x- and y-axis, and FIG. 22C shows the top views of the space consumption of the magnets for tilts along the x- and y-axis. Therefore, the design of the coil profile needs to take into account the difference in space requirements for the magnets in the x- and y-directions. The width-to-height ratios in both directions are selected to provide the best coil efficiencies. For example, the width/height ratio in the x-direction is 1.27 and in the y-direction is 1.45.

In one embodiment, the positioning system includes a processor configured to control the currents into the coils. The processor may be coupled to an input for a target position, and the processor may be coupled to one or more current drivers to drive the individual voice coil segments. In one embodiment, the positioning system further includes a sensor configured to detect the position/movement of the magnets and/or platform relative to the base. The detected position/movement may be used to provide a feedback to the processor.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A positioning system, comprising:
   a first plate;

a second plate coupled to the first plate via a pivot and pivotable about at least one axis with respect to the first plate;

a pair of voice coil actuators per steerable axis configured to rotate the second plate relative to the first plate about the at least one axis; and a processor configured to drive currents to the pair of voice coil actuators;

wherein the pair of voice coil actuators comprises a first and second magnet structures mounted on one plate at equal and opposite distance from the at least one axis, and a first and second coils mounted on the other plate and positioned such that the respective first and second magnet structures move in and out of the first and second coils when the second plate rotates about the at least one axis relative to the first plate;

wherein each of the first and second magnet structures substantially conforms to an arc having a center at the at least one axis and a radius equal to the distance of the magnet structure from the at least one axis, wherein each of the first and second coils comprises a stack of at least two independently activated coil segments, when the platform is in a neutral position, a pole of a magnet in each of the first and second magnet structures lies between two coil segments of their respective first and second coils, and when the platform is rotated, the pole of the magnet in each of the first and second magnet structures lies within an active coil segment of their respective first and second coils.

2. The system of claim 1, wherein each of the first and second magnetic structures comprises a plurality of magnets being stacked together to form the structure that conforms substantially to the arc or have a similar curved design for reducing the gap between the magnet structure and the corresponding coil so as to increase the achievable forces.

3. The system of claim 1, wherein the net force exerted to the pivot by the pair of voice coil actuators is substantially zero.

4. The system of claim 1, wherein the processor is configured to activate a coil segment when the pole of the magnet is within the coil segment.

5. The positioning system of claim 1, wherein the platform is pivotable about two axes and the platform further comprises another pair of voice coil actuators, such that one pair of voice coil actuators is configured to rotate the second plate about one of the two axes, and the other pair of voice coil actuators is configured to rotate the second plate about the other axis.

6. The positioning system of claim 1, wherein the one of the first and second plates comprises a mirror.

7. The positioning system of claim 1, further comprising a sensor configured to detect a position of a magnet structure or a relative position between the first plate and second plate.

8. The positioning system of claim 7, wherein the detected position of the magnet structure or the detected relative position between the first plate and second plate is fed back to the processor.

9. The positioning system of claim 2, wherein the magnets are disc magnets and the coils have an oval profile.

10. The positioning system of claim 5, wherein the one of the first and second plates comprises a mirror.

11. The positioning system of claim 5, further comprising a sensor configured to detect a position of a magnet structure in each of the two pairs of the voice coil actuators or a relative position between the first plate and second plate.

12. The positioning system of claim 11, wherein the detected positions of the magnet structure in each of the two pairs of the voice coil actuators or the detected relative position between the first plate and second plate is fed back to the processor.

13. The system of claim 5, wherein each of the first and second magnetic structures comprises a plurality of magnets being stacked together to form the structure that conforms substantially to the arc or have a similar curved design for reducing the gap between the magnet structure and the corresponding coil so as to increase the achievable forces.

14. The positioning system of claim 13, wherein the magnets are disc magnets and the coils have an oval profile.

* * * * *